(12) United States Patent
Koike

(10) Patent No.: US 6,838,608 B2
(45) Date of Patent: Jan. 4, 2005

(54) LYRIC DISPLAY METHOD, LYRIC DISPLAY COMPUTER PROGRAM AND LYRIC DISPLAY APPARATUS

(75) Inventor: Yuji Koike, Yokohama (JP)

(73) Assignee: Yamaha Corporation, Shizuoka-ken (JP)

(*) Notice: Subject to any disclaimer, the term of this patent is extended or adjusted under 35 U.S.C. 154(b) by 0 days.

(21) Appl. No.: 10/411,609

(22) Filed: Apr. 10, 2003

(65) Prior Publication Data
US 2003/0192424 A1 Oct. 16, 2003

(30) Foreign Application Priority Data
Apr. 11, 2002 (JP) ........................................ 2002-108698

(51) Int. Cl.[7] .............................................. G09B 15/08
(52) U.S. Cl. ................. 84/477 R; 434/307 A
(58) Field of Search ..................... 84/477 R; 434/307 A (56) References Cited

U.S. PATENT DOCUMENTS 5,649,234 A * 7/1997 Klappert et al. ......... 715/500.1
6,062,867 A * 5/2000 Torimura ................. 434/307 A
6,235,979 B1   5/2001 Yanase
6,538,188 B2 * 3/2003 Kondo ..................... 84/477 R
6,582,235 B1 * 6/2003 Tsai et al. ............... 434/307 A
2001/0037720 A1  11/2001 Funaki

* cited by examiner

Primary Examiner—Jeffrey W Donels
(74) Attorney, Agent, or Firm—Harness, Dickey & Pierce, PLC (57) ABSTRACT

Performance data and lyric data stored in an external storage device 35 is read out in accordance with the progression of a song. The performance data is sent to a tone generator 36, so that melody and accompaniment tones are reproduced by use of the performance data. The lyric data is sent to a display control circuit 14, so that lyrics represented by the lyric data are displayed on a display unit 12. The timing at which the lyrics are reproduced is determined by relative time data ΔT added to the lyric data, so that the lyrics are displayed at right positions corresponding to bar and beat positions. When a bar has lengthy lyrics, the width of the bar to be displayed on the display unit 12 is adjusted. As a result, the position of lyrics displayed corresponds to the progression of a song, resulting in users being capable of obtaining timing in both performing a musical instrument and singing when they sing a song while performing the musical instrument.

20 Claims, 7 Drawing Sheets

LYRIC DISPLAY METHOD, LYRIC DISPLAY COMPUTER PROGRAM AND LYRIC DISPLAY APPARATUS

BACKGROUND OF THE INVENTION

1. Field of the Invention

The present invention relates to a lyric display method, lyric display computer program and lyric display apparatus for displaying lyrics which are applied to apparatuses such as karaoke apparatuses and computer apparatuses having a karaoke capability.

2. Description of the Related Art

Conventionally, lyrics have been displayed in such a manner that character strings representative of lyrics are displayed in sequence on a phrase-by-phrase basis, with the color of part of the character strings sequentially changed in accordance with the progression of a song.

In such conventional manner, however, it is difficult for users to obtain right feeling of beat, since the placed position of lyrics is not coincident with musical phrase. As a result, the users have difficulty in obtaining the timing in playing a musical instrument when they sing a song while performing a musical instrument, such as a case in which they sing and accompany themselves on guitar.

SUMMARY OF THE INVENTION

The present invention was accomplished to solve the above-described problem, and an object thereof is to provide a lyric display method, lyric display computer program and lyric display apparatus which allow users to easily grasp the timing in performing a musical instrument when they sing a song while performing a musical instrument.

In order to achieve the above-described object, a feature of the present invention is that timing data is added to lyric data representative of lyrics and represents timing on the progression of a song at which the lyrics are reproduced. A position of lyrics to be displayed on the screen of a display unit is determined in corresponding relation to bar and beat positions on the basis of the timing data, and lyrics represented by the lyric data is displayed at the determined position on the screen of the display unit. In this case, the timing data may indicate either a relative time elapsed from the timing at which the preceding lyrics are reproduced or an absolute time elapsed from the start of the song. Further, chord names may be displayed along with the lyrics, being supplied together with lyrics. Furthermore, boundaries of bars also may be displayed.

According to the above, lyrics are displayed at corresponding beat positions (i.e., note positions), resulting in users being capable of obtaining the right feeling of beat. Particularly, when they sing a song while performing a musical instrument such as a case in which they sing and accompany themselves on guitar, they are allowed to easily obtain the timing in both playing the musical instrument and singing.

Another feature of the present invention is to calculate the length of lyrics to be displayed in a predetermined interval, and to adjust the width of a bar to be displayed according to the displayed length of lyrics calculated. In this case, the predetermined interval may be a bar, and the length of lyrics to be displayed in a bar may be calculated bar-by-bar. The predetermined interval may be a row, and the length of lyrics to be displayed in a row may be calculated row-by-row.

According to the above, even if the lyrics are lengthy, lyrics are displayed at corresponding beat positions (i.e., note positions) by adjusting the width of a bar, resulting in users being capable of obtaining the right feeling of beat. Particularly, when they sing a song while performing a musical instrument such as a case in which they sing and accompany themselves on guitar, they are allowed to easily obtain the timing in both playing the musical instrument and singing.

DESCRIPTION OF THE PREFERRED EMBODIMENT

Figure 1:
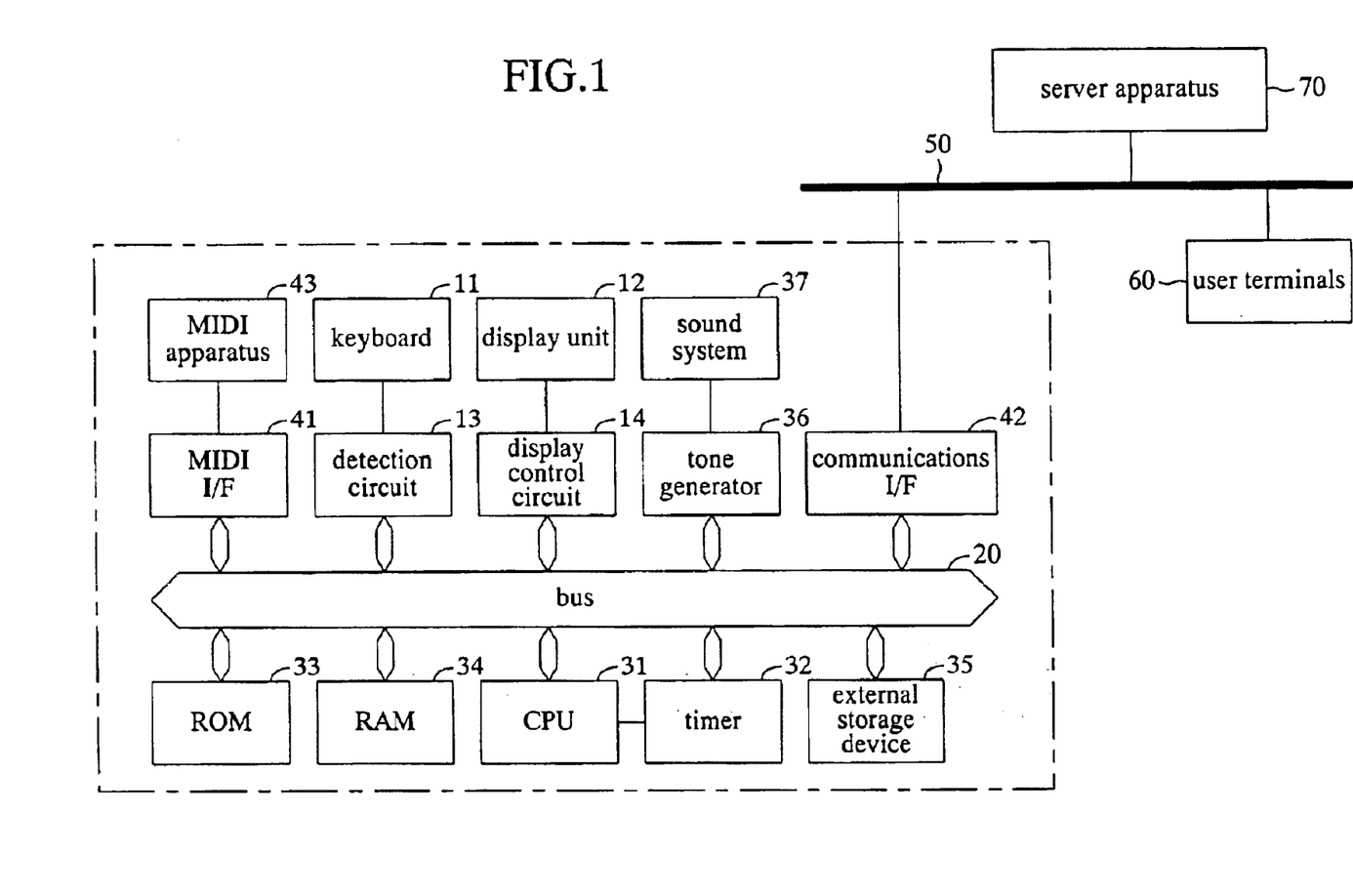
FIG. 1 is a schematic block diagram showing a personal computer apparatus to which a lyric display method, lyric display computer program and lyric display apparatus of the present invention are applied.

An embodiment of the present invention will now be described with reference to the drawings. FIG. 1 is a block diagram showing a personal computer apparatus to which a lyric display method, lyric display computer program and lyric display apparatus of the present invention are applied.

The personal computer apparatus includes a keyboard 11 and a display unit 12. The keyboard 11, which comprises a plurality of operators such as operation switches and a mouse, is operated by a user in order to instruct various operations of the personal computer apparatus. The operations of these operators are detected by ON/OFF operations of operator switches respectively which are provided in corresponding relation to each operator. The operator switches are disposed in a detection circuit 13 connected to a bus 20. The display unit 12, which is configured by a liquid crystal display, a cathode ray tube device, etc., displays characters, notes, graphics, and so on. The display conditions of the display unit 13 are controlled by a display control circuit 14 which is connected to the bus 20.

Connected to the bus 20 are a CPU 31, timer 32, ROM 33, RAM 34, external storage device 35, and tone generator 36. The CPU 31 executes programs in order to control various operations of the personal computer apparatus. The timer 32 is used for measuring time. In the ROM 33 there are previously stored a system program, some of programs for implementing various functions of the present personal computer apparatus, and various data. The RAM 34 temporarily stores variables used by the programs and at the execution of the programs.

The external storage device 35 includes a hard disk HD previously equipped in the present personal computer apparatus, various storage media applicable to the personal computer apparatus such as compact disk CD and flexible disk FD, and drive units for the storage media. These storage media, which are capable of storing and reading voluminous data and programs, store programs shown in FIGS. 2 through 5 and various data including sets of song data shown in FIG. 6A.

Figure 6A:
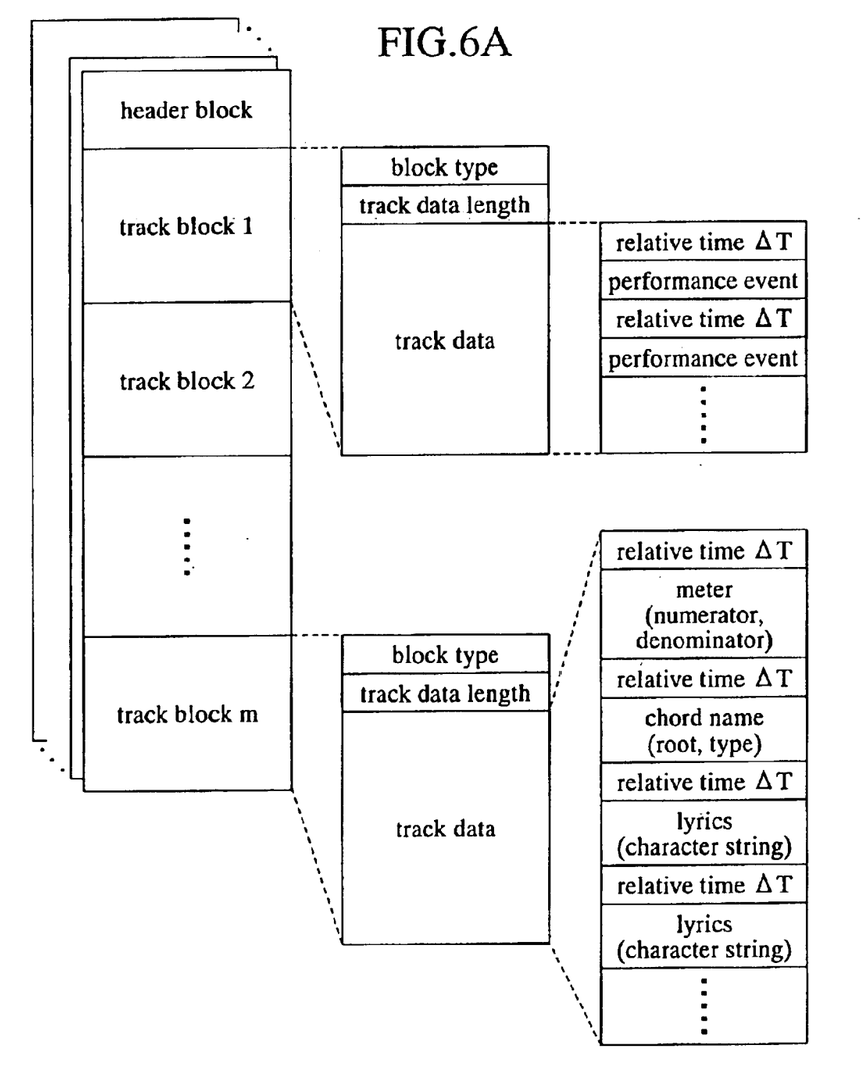
FIG. 6 is an example format of song data.

Each set of song data, which is configured in accordance with the MIDI standard, comprises a header block and track blocks 1 through m. The header block comprises a block type, data length and header data. The header data includes title data for specifying a song such as a song title. Each track block comprises a block type, track data length and track data. In this case, track blocks from the track block 1 to the track block of an arbitrary number store data on automatic performance such as melody part or accompaniment part of a song, while the track block m stores data for displaying chord names, lyrics, etc.

Each track data in track blocks storing data on automatic performance comprises relative time data $\Delta T$ and performance event data which corresponds to the progression of the song. The relative time data $\Delta T$ represents, by the number of tempo clocks, time intervals between each performance event data in accordance with the progression of the song. The tempo clock is a clock generated at minimum read-out time intervals during the reproduction of automatic performance data. The first relative time data $\Delta T$, which represents a time interval elapsed from the start of the song, is generally set at "0". Performance event data represents a key-depression (key-on), key-release (key-off), tone color selection, effect selection, etc. on the performance of a musical instrument. The performance event data representing key-depression and key-release includes the pitch of a musical tone to be generated or muffled (the type in the case of rhythm instruments), the loudness of the musical tone, etc.

Figure 6B:
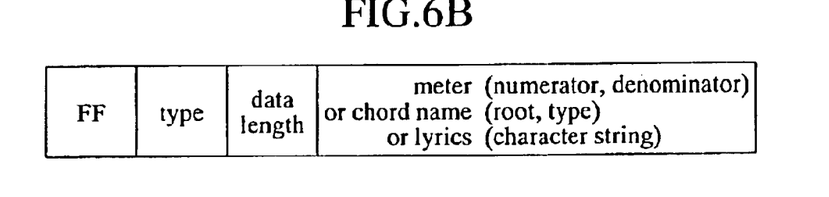

The track block m storing data on chord names, lyrics, etc. comprises relative time data $\Delta T$, meter data, chord name data and lyric data which corresponds to the progression of the song. The relative time data $\Delta T$ represents time intervals between meter data, chord name data and lyric data in accordance with the progression of the song. The first relative time data $\Delta T$ is generally set at "0". The meter data, chord name data and lyric data, which are configured by meta event data respectively, comprises a meta event code "FF", type, data length and event data as shown in FIG. 6B.

The event data in meter data represents values of the numerator and denominator of a meter, respectively. In the case of a song of four-four time, for example, the event data has "4" and "4". The event data in chord name data comprises data representative of the root of a chord (e.g., C, D, etc.) and data representative of the type of a chord (e.g., Maj, min, etc.). The event data in lyric data comprises a character string representative of lyrics.

The tone generator 36 inputs performance event data and forms musical tone signals represented by the performance event data. To the tone generator 36 there is connected a sound system 37. The sound system 37, which comprises amplifiers, speakers, etc., generates musical tones corresponding to the musical tone signals formed by the tone generator 36.

To the bus 20 there are also connected a MIDI interface circuit 41 and a communications interface circuit 42. The MIDI interface circuit 41 is configured to connect to a MIDI apparatus 43 which is MIDI-compatible such as an electronic musical instrument and personal computer. The MIDI interface circuit 41 retrieves various data and programs from the MIDI apparatus 43. The communications interface circuit 42 is connected to a communications network 50 such as the Internet. To the communications network 50 there are connected not only a multitude of user terminals 60 configured in the same manner as the above-described personal computer but also one or more server apparatus 70. The above-described personal computer is configured to retrieve various data and programs from the server apparatus 70.

Next, the operations of the embodiment configured as described above will be explained. A user operates the keyboard 11 in order to select song data of which he/she desires the automatic performance and lyric display, and to write the selected song data on the RAM 34. On this selection, a set of song data is selected from among sets of song data stored in the external storage device 35 (hard disk HD, compact disk CD, flexible disk FD, etc.). The user may also retrieve a set of song data from the MIDI apparatus 43 or server apparatus 70 connected to the communications network 50 via the MIDI interface circuit 41 or communications interface circuit 42.

Figure 2:
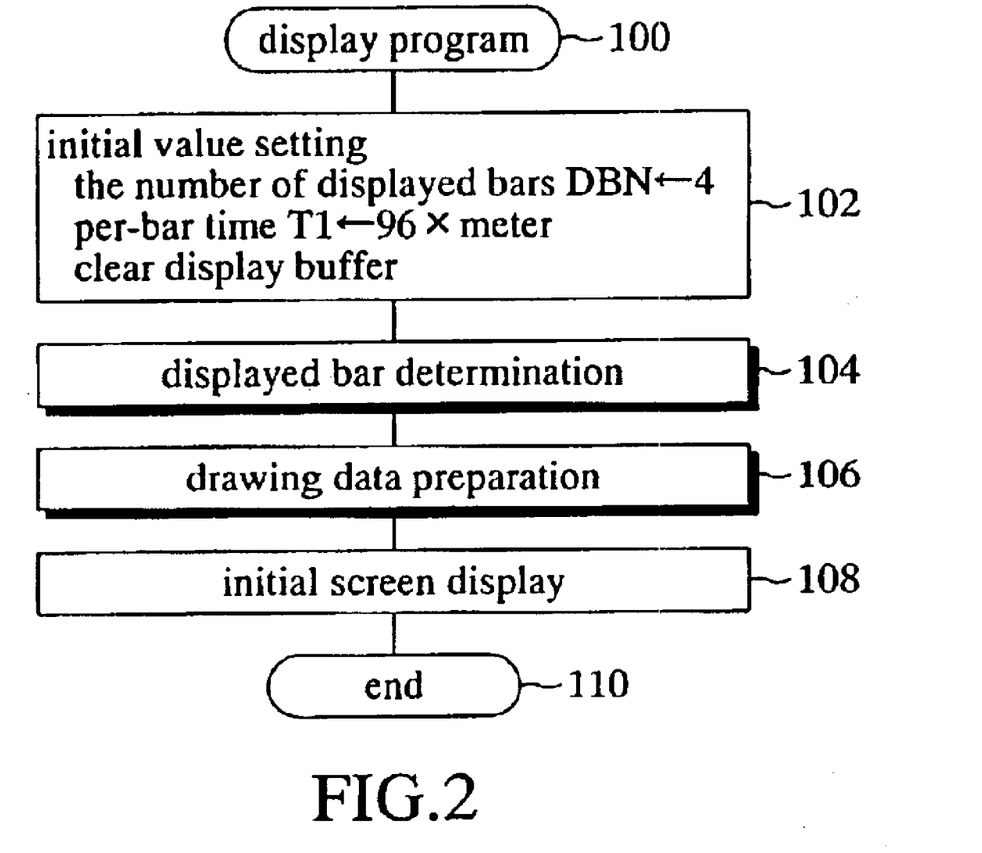
FIG. 2 is a flow chart showing a display program run on the personal computer apparatus shown in FIG. 1.

Next, the user operates the keyboard 11 in order to start the display program shown in FIG. 2. On the startup of the program, the display program stored in the hard disk HD of the external storage device 35 is transferred to the RAM 34 before the CPU 31 starts executing the display program stored in the RAM 34. If the hard disk HD of the external storage device 35 does not store the display program, the display program stored in the compact disk CD or flexible disk FD of the external storage device 35, the display program stored in the MIDI apparatus 43, or the display program stored in the outside server apparatus 70 via the communications network 50 and communications interface circuit 42 is available. In addition, a performance reproduction program described later is treated as in the case of the above-described display program.

The CPU 31 starts the display program at step 100 shown in FIG. 2 and proceeds to step 102 where the number of displayed bars DBN and a per-bar time T1 are set to the initial value. The number of displayed bars DBN, which is a variable representing the number of bars to be displayed in a row on the display unit 12, is initially set to "4". The per-bar time T1 is a variable representing the value of tempo clocks per bar. The CPU 31 reads a meter (numerator/denominator) stored in the track block m and set the per-bar time T1 to the value obtained by multiplying "96" by the readout meter. As described above, as the tempo clocks are a clock generated at minimum read-out time intervals during the reproduction of automatic performance data, the tempo clocks "24" corresponds to the length of a quarter note. At the step 102, the CPU 31 clears data storage area such as display buffer area described later.

After the initial setting at the step 102, the CPU 31 proceeds to step 104 in order to execute a displayed bars determination routine. Then, at step 106 the CPU 31 executes a drawing data preparation routine and proceeds to step 108.

Here explained is the displayed bars determination routine. The routine is started at step 200 shown in FIG. 3. Following the startup of the routine, the CPU 31 initializes at step 202 a readout pointer, time position TP and lyric character string lengths LL(1) through LL(n). The readout pointer, which is a variable for reading event data in the track block m, is initially set to the value of the first address of the track block m. The time position TP, which is a variable representing the time position from the start of the song in tempo clocks, is initially set to "0". The lyric character string lengths LL(1) through LL(n) will be explained later.

Figure 3:
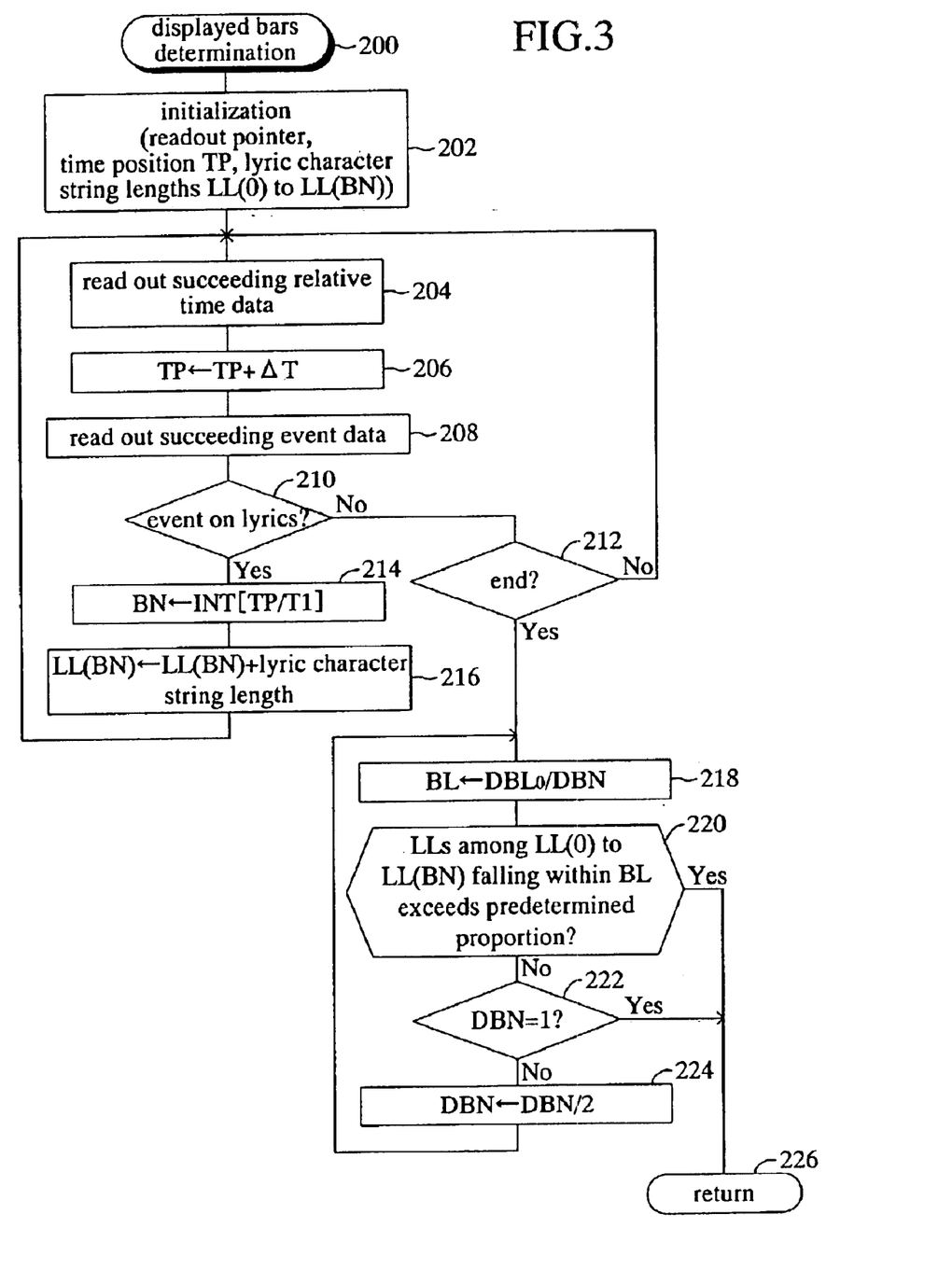
FIG. 3 is a flow chart detailing a displayed bars determination routine shown in FIG. 2.

At step 204 the CPU 31 sets forward the readout pointer and reads out succeeding relative time data $\Delta T$ in the track block m. At step 206 the CPU 31 adds the readout relative time data $\Delta T$ to the time position TP in order to update the time position TP. The resultant time position TP indicates, in tempo clocks, the time elapsed from the start of the song till the timing at which the succeeding event data is reproduced.

At step 208 the CPU 31 reads out event data (meta event data) and determines whether the event data is on lyrics. If not, the CPU 31 gives "NO" to step 210 and proceeds to step 212 in order to determine whether all the event data stored in the track block m has been read out. Before all the event data has been read out, the CPU 31 gives "NO" at step 212 and returns to step 204. The CPU 31 then repeats the processes from the steps 204 through 212 until the CPU 31 detects event data on lyric. During the repeated processes of the steps 204 through 212, however, the relative time data $\Delta T$ is accumulated at every processing at step 206. As a result, at the point where the event data on lyric is read out, the time position TP signifies the tempo clocks indicating the time elapsed from the start of the song till the readout of the lyric event data.

If lyric event data is read out, the CPU 31 gives "YES" at step 210 and proceeds to step 214. At the step 214 the CPU 31 performs a computation of Eq. 1 shown below by use of the time position TP and per-bar time T1 in order to obtain a bar number BN.

$$BN=INT[TP/T1] \quad (Eq. 1)$$

The operator INT[z] in the above Eq. 1 takes only the whole number part of a variable [z], with the fractional portion of the variable [z] rounded down. Therefore, the resultant bar number BN signifies the ordinal position of the bar in which the above-read lyric event data is included, numbering the first bar of the song as "0".

After processing the step 214, the CPU 31 adds the lyric character string length of the lyric event data read out at the step 208 to the displayed lyric length LL (BN) determined by the bar number BN. The lyric character string length LL (BN), which is provided for each bar, numbering the first bar of the song as "0", is an array variable used for calculating the character string length of lyrics to be displayed in a bar. At the initialization process of the step 202, the previously provided lyric character string lengths LL(0) through LL(n) are initially set to "0", respectively. However, the element number, namely "n" of the lyric character string length LL may be provided dynamically in accordance with the number of bars contained in a song to be displayed and reproduced. Alternatively, a certain element number (a value larger than the number of bars contained in any song) may be previously fixed. The lyric character string length of the read-out lyric event data is calculated by multiplying the font size of characters (specifically, the horizontal length on the screen) by the number of the characters in the lyrics. For simplifying the description of the present embodiment, the font size of characters is regarded as identical with every type of characters. The font size of characters, the displayed lyric lengths LL(0) through LL(n) and various lengths displayed on the display unit 12 described later may be expressed in either points or various units such as millimeters, inches or pixels.

After processing the step 216, the CPU 31 repeats the processes from the steps 204 through 216 until all the data stored in the track block m of the selected song is read out. At every time lyric event data is read out during the repeated processes of the steps 204 through 216, the character string length of the read-out lyrics is accumulated to the lyric character string length LL(BN) for the bar by the steps 214 and 216. As a result, the total character string length of the lyrics of each bar is calculated bar-by-bar as follows: lyric character string length LL(0), LL(1), LL(2), LL(3) . . . LL(BN). The bar number BN in this case indicates the last bar.

After reading all the data stored in the track block m of the selected song, the CPU 31 gives "YES" at the step 212 and proceeds to the step 218 and later steps. At the step 218 the CPU 31 divides a predetermined display area width $DBL_O$ (see FIG. 7) representing the width of a display area for lyrics to be displayed on the display unit 12 by the number of displayed bars DBN initially set to "4" at the step 102 shown in FIG. 2 in order to obtain a displayed bar length BL which represents the display length per bar. At the following step 220, the CPU 31 examines whether the proportion of the lyric character string lengths which fall within the displayed bar length BL among all the lyric character string lengths LL(0), LL(1), LL(2), LL(3) . . . LL(BN) exceeds a predetermined ratio. In other words, the CPU 31 searches for the lyric character string lengths that fall within the displayed bar length BL across all the lyric character string lengths LL(0), LL(1), LL(2), LL(3) . . . LL(BN), divides the number of the lyric character string lengths falling within the displayed bar length BL by "the total number of bars BN+1" in order to obtain the proportion of them, and examines whether the obtained proportion exceeds the predetermined proportion.

In the present embodiment, the predetermined proportion is set to 80%, for too long a bar length allows only a small amount of chord names and lyrics to be displayed due to processes described later, resulting in users being forced to frequently scroll bars. In this case, however, a situation happens to the 20 percent of bars where lyrics are overlaid on those in the succeeding bar. In order to avoid such situation, the predetermined proportion may be set to 100%. Conversely, in the cases where the overlay of lyrics is acceptable such as a case of a small screen, the predetermined proportion may be less than 80%. Alternatively, users may be allowed to arbitrarily set the predetermined proportion within a specified range.

When "YES" is given to the step 220, namely the calculated proportion is the predetermined proportion or more, the CPU 31 proceeds to step 226 in order to terminate the displayed bars determination routine. In this case, the displayed bar length BL is to have the length obtained by dividing the display area width $DBL_O$ by the number of displayed bars DBN(=4) which is the initial setting value.

On the other hand, when "NO" is given to the step 220, namely the calculated proportion is less than the predetermined proportion, the CPU proceeds to step 222 in order to determine whether the number of displayed bars DBN is "1". Since the number of displayed bars DBN is "4", in this case, the CPU 31 gives "NO" at step 222 and proceeds to step 224. At the step 224, the CPU 31 divides the number of displayed bars DBN by "2" and updates the number of displayed bars DBN to the calculated value. The CPU 31 then returns to the step 218.

In this case, since the number of displayed bars DBN is updated to 2, the displayed bar length BL to be obtained at the step 218 is double the aforementioned case. At the step 220 when the above-stated proportion which is obtained by re-calculating by use of the doubled displayed bar length BL is the predetermined proportion or more, the CPU 31 gives "YES" to the step 220 and terminates the displayed bars determination routine at step the 226. In this case, the displayed bar length BL is to have the length obtained by dividing the display area width $DBL_O$ by the number of displayed bars DBN(=2) which has been changed from the initial setting value.

When the doubled displayed bar length BL still keeps the step 220 at "NO", namely the above calculated proportion is still less than the predetermined proportion, the CPU 31 proceeds to the step 222 again. In this case, since the number of displayed bars DBN is still "2", the CPU 31 gives "YES" at the step 222 and proceeds to the step 224 where the number of displayed bars DBN is divided by "2", and the calculated value is set as the updated number of displayed bars DBN. The CPU 31 then returns to the step 218.

In this case, since the number of displayed bars DBN has been updated to "1", the displayed bar length BL to be obtained at the step 218 is further double the aforementioned case. At the step 220 when the above-stated proportion which is obtained by re-calculating by use of the further doubled displayed bar length BL is the predetermined proportion or more, the CPU 31 gives "YES" to the step 220 and terminates the displayed bars determination routine at step the 226. In this case, the displayed bar length BL equals the length of the display area width $DBL_0$.

Even in the cases where the displayed bar length BL equals the length of the display area width $DBL_0$, and "NO" is given to the step 220, namely the above calculated proportion is less than the predetermined proportion, the displayed bar length BL will not be extended any further. In other words, since the number of displayed bars DBN is "1" already, the CPU 31 gives "YES" at the step 222 and terminates the displayed bars determination routine at step the 226. These processes serve to prevent a bar being displayed over 2 rows. Alternatively, when a bar is allowed to be displayed over 2 rows, the step 222 may be omitted in order to repeat the processes of the steps 218 through 224 until "YES" is given to the step 220.

In the above description, the step 224 is configured to perform a division so that the number of displayed bars DBN is decreased in the order of 4 bars, 2 bars and a bar, however, the number of displayed bars DBN may be decreased by one. In this case, the division performed at the step 224 may be changed to the subtraction where "1" is subtracted from the number of displayed bars DBN.

Next, the drawing data preparation routine of the step 106 shown in FIG. 2 will be explained. The drawing data preparation routine is started at step 300 of FIG. 4. After starting the routine, at step 302, as in the case of the step 202 of FIG. 2, the CPU 31 initializes the readout pointer for reading event data in the track block m and the time position TP representing in tempo clocks the time position elapsed from the start of the song. At the step 302, though, the lyric character string lengths LL(1) through LL(n) are not cleared.

Figure 4:
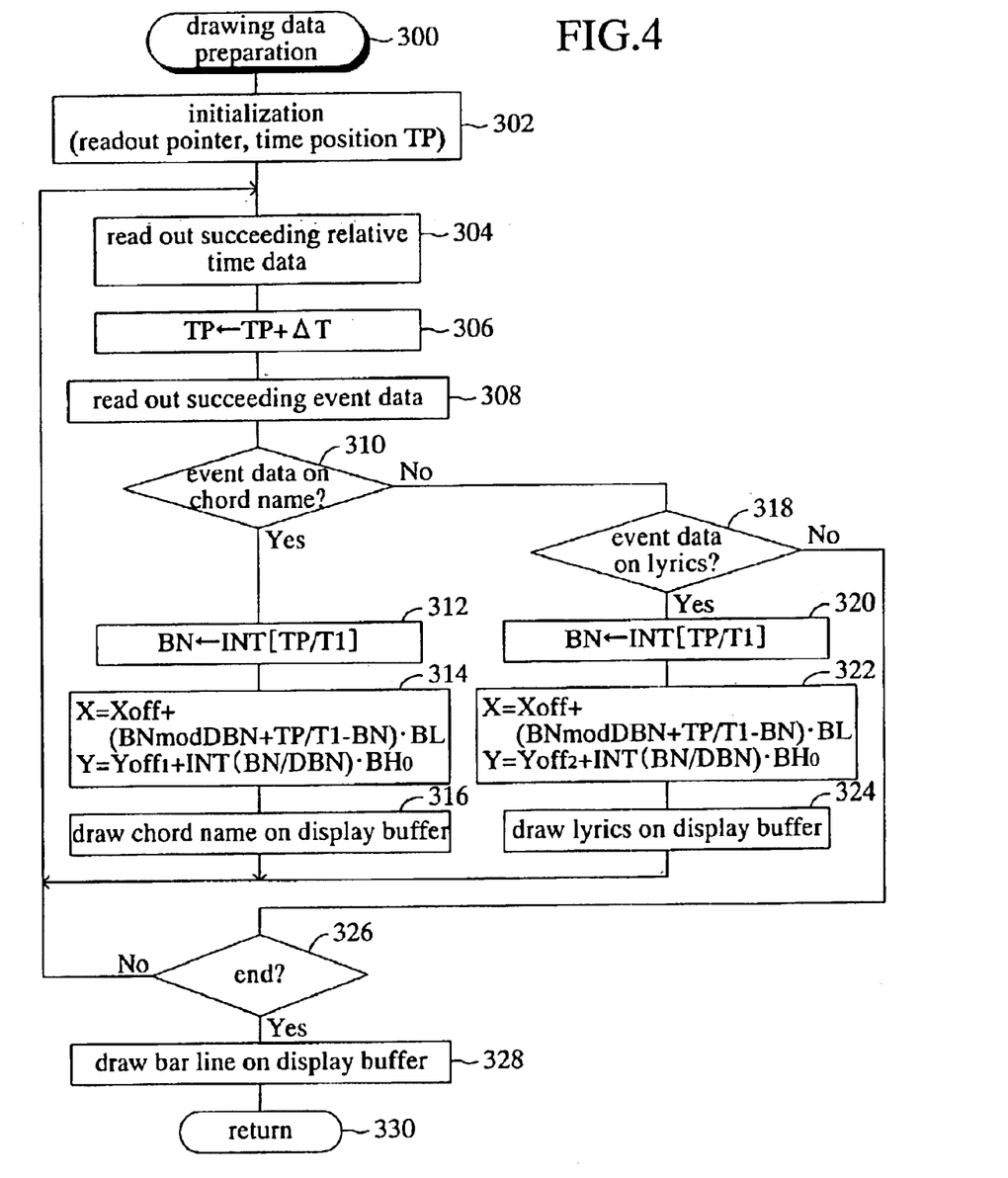
FIG. 4 is a flow chart detailing a drawing data preparation routine shown in FIG. 2.

Following the step 302, the CPU 31 repeats the processes of steps 304 through 326 until the CPU 31 reads all the event data stored in the track block m. The processes performed in the steps 304 through 308, 318 and 326 are the same as the steps 204 through 212 of FIG. 3. More specifically, in the repeated processes of the steps 304 through 326, the CPU 31 reads in sequence the event data in the track data stored in the track block m, while accumulating the relative time data ΔT in order to obtain the current time position TP.

Figure 7:
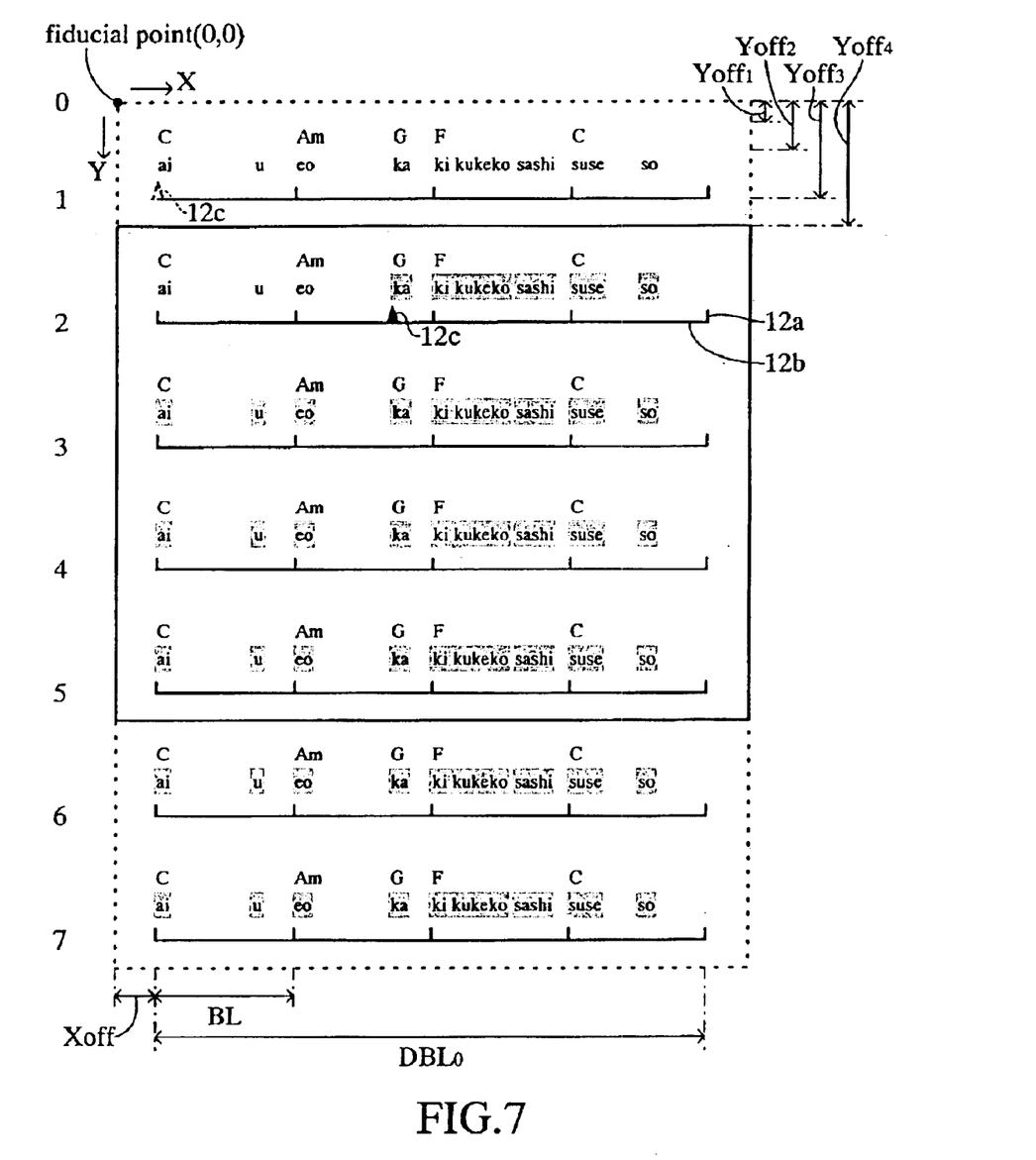
FIG. 7 is an example screen displaying chord names and lyrics on a display unit.

When reading event data on chord name, the CPU 31 gives "YES" at step 310 and proceeds to step 312. At the step 312, as in the case of the step 214 of FIG. 3, the CPU 31 performs a computation of the Eq. 1 by use of the time position TP and per-bar time T1 in order to obtain the bar number BN. At step 314 the CPU 31 then performs computations of Eqs. 2 and 3 shown below by use of the above-obtained bar number BN, and the number of displayed bars DBN and displayed bar length BL obtained by the processes of the displayed bars determination routine in the FIG. 3 in order to obtain the display position (X, Y) of a chord name on the screen of the display unit 12. As shown in FIG. 7, setting a fiducial point (0, 0) for drawing at the upper-left corner of the screen of the display unit 12, X represents a coordinate position in the rightward direction from the fiducial point, while Y represents a coordinate position in the downward direction from the fiducial point.

$$X = Xoff + (BN\mathrm{mod}DBN + TP/T1 - BN) \cdot BL \quad \text{(Eq. 2)}$$

$$Y = Yoff1 + INT[BN/DBN] \cdot BH_0 \quad \text{(Eq. 3)}$$

In the Eq. 2, "Xoff" represents the offset in the direction of X (rightward in FIG. 7) provided for the display of chord names, lyrics and bar lines. The value calculated from "BNmodDBN" in the Eq. 2 represents the remainder left when the bar number BN is divided by the number of displayed bars DBN. In the Eq. 3, "Yoff1" represents the offset in the direction of Y (downward in FIG. 7) provided for the display of chord names. Next explained will be that the Eqs. 2 and 3 determine the display position (X, Y) of a chord name, using an example.

Assume that the read-out event data on chord name is "G" on the 3rd beat of the 6th bar (chord name "G" on the 2nd row in FIG. 7), with the number of displayed bars DBN being "4". In this example, the bar number BN (=INT[TP/T1]) is "5", while the value obtained from "BNmodDBN" being "1", and the divided value of "TP/T1" being "5.75". The resultant coordinate value "X" obtained from the above is "Xoff+1.75BL". On the other hand, the value obtained from "INT[BN/DBN]" is "1", resulting in the coordinate value Y being "Yoff1+$BH_0$. As a result, the display position (X, Y) of the chord name in this case is to signify the position of "G" on the 3rd beat of the 6th bar.

Following the step 314, at step 316 the CPU 31 draws a chord name represented by chord event data on the display buffer area provided in the RAM 34. The display buffer area is provided in such a manner so as to correspond to all the pixels provided in the screen of the display unit 12. More specifically, the CPU 31 writes, into the display buffer area, pixel data to be displayed which corresponds to a letter (e.g. "G") representative of the chord name. The display buffer area has been cleared at the initialization of the step 102 so that nothing has been displayed on the display unit 12.

When event data on lyrics is read out, on the other hand, the CPU 31 gives "YES" at step 318 and proceeds to step 320. Then at the step 320, as in the case of the step 312, the CPU 31 performs the calculation of the Eq. 1 in order to obtain the bar number BN. Then at step 322, as in the case of the step 314, the CPU 31 performs the calculation of the Eq. 2 in order to obtain the X coordinate for displaying lyrics, while performing the calculation of Eq. 4 shown below in order to obtain the Y coordinate for displaying lyrics.

$$Y = Yoff2 + INT[BN/DBN] \cdot BH_0 \quad \text{(Eq. 4)}$$

In the Eq. 4, "Yoff2" represents the offset in the direction of Y provided for the display of a lyric (see FIG. 7). From the above explanation about the display position of a chord name, it is apparent that the display position (X, Y) of lyrics can be derived from the above calculations. Following the step 322, the CPU 31 draws, at step 324, lyrics (a character string comprising a character or characters) represented by lyric event data on the display buffer area provided in the RAM 34. More specifically, the CPU 31 writes pixel data which corresponds to the lyrics (a character or characters) into the display buffer area.

After reading out all the event data stored in the track block m by repeating the processes of the steps 304 through 326, the CPU 31 gives "YES" at the step 326 and proceeds to step 328. At the step 328, by use of the above-calculated bar number BN and displayed bar length BL, and a predetermined offset Yoff3 in the Y direction provided for bar lines 12a which indicate bar breaks, the CPU 31 figures out the starting point (X, Y) and endpoint (X, Y) of each bar and draws, on the display buffer area provided in the RAM 34, the bar lines 12a to be provided for all the bars from the first one to the last one. The CPU 31 also draws base lines 12b provided for the bar lines 12a on the display buffer area in the RAM 34. More specifically, the CPU 31 writes, into the display buffer area, pixel data corresponding to the bar lines 12a and base lines 12b. After processing the step 328, the drawing data preparation routine is terminated at step 330.

Next re-explained will be the display program shown in FIG. 2. Following the displayed bars determination routine and drawing data preparation routine in the steps 104 and 106, the CPU 31 performs an initial screen display process at step 108. In the initial screen display process, the CPU 31 sends to the display control circuit 14 a certain amount of pixel data from among the pixel data stored in the display buffer area of the RAM 34. To be sent here is the pixel data in the amount equivalent to a whole screen from the top (i.e., storage position corresponding to the fiducial point (0, 0)). The display control circuit 14 controls the display unit 12 in accordance with the received pixel data. As a result, the display unit 12 displays the chord names, lyrics, bar lines 12a and base lines 12b only in the amount which fits into a screen. When a screen can contain 4 rows, for example, on the display unit 12 there are displayed the chord names, lyrics, bar lines 12a and base lines 12b for 4 rows from the top of the FIG. 7 (corresponding to 0, 1, 2 and 3 numbered at the left of the figure). At the step 108, in addition, a marker 12c indicative of the present location of the performance reproduced is displayed at the start position of the song on the screen as shown by broken lines in FIG. 7.

Figure 5:
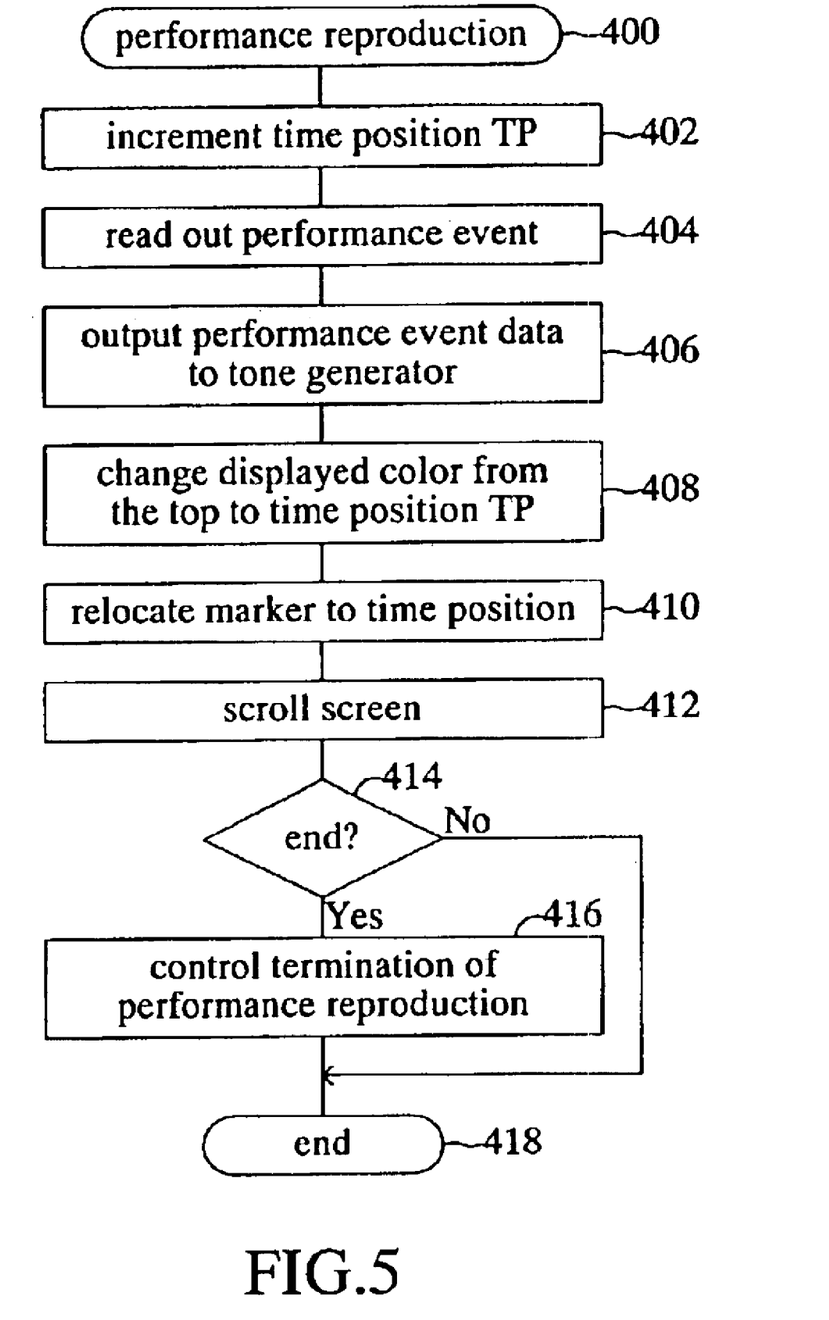
FIG. 5 is a flow chart showing a performance reproduction program run on the personal computer apparatus shown in FIG. 1.

When a user operates the keyboard 11 in order to start the reproduction of the selected song, the CPU 31 starts the performance reproduction program shown in FIG. 5 at every timing of the tempo clock, working together with the timer 32. The timing of the tempo clock, which is determined in accordance with tempo data of a song by a program which is not shown, is the timing in which 24 clocks are counted per quarter note. In other words, at the timing of one-twenty-fourth of the length of a quarter note, the performance reproduction program is repeatedly executed.

The performance reproduction program is started at step 400 of the FIG. 5. At step 402 the CPU 31 then increments the time position TP by "1", the time position TP having been cleared to "0" at the start of the reproduction of the song. Therefore, the time position TP is incremented from "0" by "1" at every time the performance reproduction program is executed.

Next, a process for reading out performance event data is executed at step 404. At this process, the CPU 31 reads out, in accordance with the progression of the song, the relative time data ΔT and performance event data stored in the track blocks which store data on automatic performance such as melody part and accompaniment part of a song. While reading the relative time data ΔT and performance event data, the CPU 31 accumulates the read-out relative time data ΔT for each track block and compares the accumulated value with the time position TP incremented by the process of the step 402. When the accumulated value is coincident with the time position TP, the CPU 31 reads out succeeding performance event data and relative time data ΔT. The CPU 31 then adds the relative time data ΔT read out here to the accumulated value which has been coincident with the time position TP and compares the resultant accumulated value (current accumulated value) with the time position TP. Until the accumulated value is coincident with the time position TP, the CPU 31 repeats to seek the timing for reading succeeding performance event data and relative time data ΔT.

Following the step 404, at step 406 the CPU 31 outputs the performance event data in the track blocks read out by the process of the step 404 to the tone generator 36. The tone generator 36 forms musical tone signals corresponding to the received performance event data and generates musical tones corresponding to the formed musical tone signals via the sound system 37. These processes allow the performance data stored in the track blocks to be reproduced. Therefore; the song comprising a series of melody tones and accompaniment tones is played through the sound system 37.

At step 408, on the basis of the time position TP which has been incremented as explained above, the color of chord names and lyrics from the top through the current position of the song displayed on the displayed unit 12 is sequentially changed in accordance with the progression of the song. At step 410, on the basis of the time position TP, the marker 12c indicative of the current position of the song is relocated. For instance, FIG. 7 shows a screen of the display unit 12 where the song has progressed till the 3rd beat of the 6th bar.

Following the steps 408 and 410, at step 412 the CPU 31 scrolls the screen of the display unit 12 as necessary. On scrolling, the screen is scrolled every time the progression of the song reaches the end of a row (in the case of FIG. 7, each end of 4 bars). More specifically, every time the time position TP reaches the end of a row, the CPU 31 outputs, to the display control circuit 14, pixel data for predetermined rows (4 rows in the case of the present embodiment) starting from succeeding row, the pixel data being stored in the display buffer area provided in the RAM 34. The display control circuit 14, on the basis of the provided pixel data, displays on the screen of the display unit 12 chord names, lyrics, bar lines 12a, etc. to be contained in the predetermined rows. The scrolling (display switching) may be done either instantly or gradually. At the scrolling process, the color of displayed chord names and lyrics, and the position of the marker 12c are also refreshed on the basis of the time position TP. A solid lined box in FIG. 7 shows a screen to be displayed on the display unit 12 when the screen has been scrolled down after the progression of the song had reached the end of the first row (i.e., 4 bars have passed).

Following the step 412, the CPU 31 determines at step 414 whether the data in all the track blocks storing performance data has been read out: in other words, the CPU 31 determines whether the reproduction of the song has been completed. If not, the CPU 31 gives "NO" at the step 414 and temporarily terminates the performance reproduction program at step 418. In this case, the CPU 31 re-executes the performance reproduction program at the succeeding timing of the tempo clock. On the other hand, if the song has been completed, the CPU 31 gives "YES" at the step 414, controls the termination of the reproduction of the song at step 416, and terminates the performance reproduction program at the step 418. In this case, the performance reproduction program will not be executed any more.

According to the present embodiment, as understood from the above description, the drawing data preparation routine shown in FIG. 4, specifically the processes of the steps 314 and 322 determines where to place chord names and lyrics on the screen of the display unit 12 in corresponding relation to bar and beat positions. As a result, lyrics are displayed at corresponding beat positions (i.e., note positions), resulting in users being capable of obtaining the right feeling of beat. In particular, when they sing a song while performing a musical instrument such as a case in which they sing and accompany themselves on guitar, the display of lyrics according to the present embodiment allows the users to easily obtain the timing in both playing the musical instrument and singing.

According to the above embodiment, additionally, the displayed bars determination routine shown in FIG. 3 adjusts the width of a bar to be displayed on the display unit 12 in accordance with the length of lyrics contained in each bar. As a result, even in a bar with lengthy lyrics, the lyrics are displayed at right beat positions (i.e., note positions).

In the above embodiment, by processing of steps 218 through 222, the displayed bar length BL and the number of displayed bars DBN are determined on the basis of the proportion of the lyric character string lengths which fall within the displayed bar length BL among all the lyric character string lengths LL(0), LL(1), LL(2), LL(3) . . . LL(BN) exceeds a predetermined ratio. However, the displayed bar length BL and the number of displayed bars DBN may be determined on the basis of the proportion of rows having the lyric character string lengths which fall within the display area width $DBL_0$ among all the rows exceeds a predetermined ratio. In this case, the lyric character string lengths belonging to the same row are accumulated among all the lyric character string lengths LL(0), LL(1), LL(2), LL(3) . . . LL(BN), and the accumulated values for each row are compared with the display area width $DBL_0$.

In the above-embodiment, the relative time data $\Delta T$ representing relative time between preceding and succeeding data is used as timing data which determines the timing at which performance event data, chord name data and lyric data in the song data is reproduced. In order to determine the timing in reproducing performance data, chord name data and lyric data, however, the relative time data $\Delta T$ may be substituted by timing data representing the absolute time from the start of the song.

In the above embodiment, furthermore, employed at the step 102 of the display program in FIG. 2 as an initial value for the number of displayed bars DBN is "4". However, the initial value may be any other value such as "6" or "8". In addition, on the display unit 12 there are displayed chord names and lyrics for 4 rows at a time, however, the number of rows employed here is just an example; any number of rows may be employed.

Furthermore, the bar lines 12a and base lines 12b on the display unit 12 may be drawn anywhere as far as they define boundaries of each bar; the bar lines 12a and base lines 12b may be drawn above the chord names and lyrics or between them. Besides, the base lines 12b may be omitted, using only the bar lines 12a. The boundaries of bars may also be defined by a given shape such as rectangle or oval. Further, boundary lines may even be omitted as far as any other manner which provides users with easy recognition of boundaries of bars is employed such as assigning a varied background color for each bar.

In the above embodiment, furthermore, chord names and lyrics are displayed before the automatic performance data is reproduced. However, the timing in starting the display of chord names and lyrics may be synchronized with the timing in starting the reproduction of automatic performance data. In this case, in order to synchronize these timings, the timing in sending the pixel data to the display control circuit 14 at the initial screen display process of the step 108 of FIG. 2 may be delayed by use of a delay buffer to the timing at which the reproduction of automatic performance data shown in FIG. 5 is started.

In the above embodiment, furthermore, data such as performance data, chord name data and lyric data complies with the MIDI format, however, the format of these data is not limited to the MIDI format; other multimedia formats may be adopted as far as the timing in generating musical tones can be associated, in terms of time, with the timing in reproducing character strings such as chord names and lyrics.

In the above embodiment, furthermore, all the drawing data for a song is provided to the display buffer area in the RAM 34 before the performance of the song is started. Alternatively, the display buffer area may initially receive drawing data for only a screen, receiving following data one after another and displaying the received data in the course of reproducing the song.

In the above-described embodiment, the description has been given on examples in which a personal computer is used. However, the present invention is also applicable to various electronic devices having a computer such as personal digital assistant (PDA), cellular phone (mobile terminal), game machine and electronic musical instrument.

Furthermore, in carrying out the present invention, it will be understood that the present invention is not limited to the above-described embodiment and its variations, but various modifications may be made without departing from the spirit and scope of the invention.

What is claimed is:

1. A lyric display method for displaying lyrics on a display unit, said lyric display method comprising:
   a displayed length calculation step for calculating the length of lyrics represented by lyric data to be displayed in a predetermined interval;
   a bar width adjusting step for adjusting the width of each bar to b displayed according to the displayed length of lyrics calculated:
   a position determination step for determining, on the basis of timing data which is added to the lyric data representative of lyrics and represents timing on the progression of a song at which the lyrics are reproduced, a position of lyrics to be displayed on a screen of said display unit in corresponding relation to bar and beat positions: and
   a display step for displaying lyrics represented by the lyric data a the determined position as well as boundaries of bars having the adjusted width on the screen of said display unit.

2. A lyric display method according to claim 1, wherein said displayed length calculation step calculates, bar-by-bar, the length of lyrics to be displayed in a bar.

3. A lyric display method according to claim 1, wherein said displayed length calculation step calculates, row-by-row, the length of lyrics to be displayed in a row.

4. A lyric display method according to claim 1, wherein said display step further displays chord names along with lyrics, the chord names being supplied together with lyrics.

5. A lyric display computer program for displaying lyrics on a display unit, said lyric display computer program including:
   a displayed length calculation step for calculating the length of lyrics represented by lyrics data to be displayed in a predetermined interval;
   a bar width adjusting step for adjusting the width of each bar to be displayed according to the displayed length of lyrics calculated:

a position determination step for determining, on the basis of timing data which is added to the lyric data representative of lyrics and represents timing on the progression of a song at which the lyrics are reproduced, a position of lyrics to be displayed on a screen of said display unit in corresponding relation to bar and beat positions; and a display step for displaying lyrics represented by the lyric data at the determined position as well as boundaries of bars having the adjusted width on the screen of said display unit.

6. A lyric display computer program according to claim 5, wherein said displayed length calculation step calculates, bar-by-bar, the length of lyrics to be displayed in a bar.

7. A lyric display computer program according to claim 5, wherein said displayed length calculation step calculates, row-by-row, the length of lyrics to be displayed in a row.

8. A lyric display computer program according to claim 5, wherein said display step further displays chord names along with lyrics, the chord names being supplied together with lyrics.

9. A lyric display apparatus for displaying lyrics on a display unit, said lyric display apparatus comprising:

a displayed length calculation portion for calculating the length of lyrics represented by lyrics data to be displayed in a predetermined interval:

a bar width adjusting portion for adjusting the width of each bar to be displayed according to the displayed length of lyrics calculated:

a position determination portion for determining, on the basis of timing data which is added to the lyric data representative of lyrics and represents timing on the progression of a song at which the lyrics are reproduced, a position of lyrics to be displayed on a screen of said display unit in corresponding relation to bar and beat positions; and a display portion for displaying lyrics represented by the lyric data at the determined position as well as boundaries of bars having the adjusted width on the screen of said display unit.

10. A lyric display apparatus according to claim 9, wherein said displayed length calculation portion calculates, bar-by-bar, the length of lyrics to be displayed in a bar.

11. A lyric display apparatus according to claim 9 wherein said displayed length calculation portion calculates, row-by-row, the length of lyrics to be displayed in a row.

12. A lyric display apparatus according to claim 9, wherein said display portion further displays chord names along with lyrics, the chord names being supplied together with lyrics.

13. A chord name display method for displaying chord names on a display unit, said chord name display method comprising:

a position calculating step for calculating, on the basis of mathematical computation by use of parameters with respect to bars, a position of the chord name represented by chord data on a screen of said display unit: and a display step for displaying the chord name represented by the chord data at the calculated position.

14. A chord name display method according to claim 13, wherein said parameters include at least one of the number of displayed bars to be displayed in a row, the bar number representing the ordinal position of the bar in which the chord name is included and a display bar length representing the display length per bar.

15. A chord name display computer program for displaying chord names on a display unit, said chord name display computer program including:

a position calculating step for calculating, on the basis of mathematical computation by use of parameters with respect to bars, a position of the chord name represented by chord data on a screen of said display unit: and a display step for displaying the chord name represented by the chord data at the calculated position.

16. A chord name display apparatus for displaying chord names on a display unit, said chord name display apparatus comprising:

a position calculating portion for calculating, on the basis of mathematical computation by use of parameters with respect to bars, a position of the chord name represented by chord data on a screen of said display unit; and a display portion for displaying the chord name represented by the chord data at the calculated position.

17. A lyric display method for displaying lyrics on a display unit, said lyric display method comprising:

a position calculating step for calculating, on the basis of mathematical computation by use of parameters with respect to bars, a position of lyrics represented by lyric data in the orthogonal direction to a displayed progression direction of the lyrics represented by lyric data on a screen of said display unit; and a display step for displaying the lyrics represented by lyric data a the calculated position.

18. A lyric display method according to claim 17, wherein said parameters include at least one of the number of displayed bars to be displayed in a row and the bar number representing the ordinal position of the bar in which the chord name is included.

19. A lyric display computer program for displaying lyrics on a display unit, said lyric display computer program including:

a position calculating step for calculating, on the basis of mathematical computation by use of parameters with respect to bars, a position of lyrics represented by lyric in the orthogonal direction to a displayed progression direction of the lyrics represented by a lyric data on a screen of a display unit; and a display step for displaying the lyrics represented by lyric data at the calculated position.

20. A lyric display apparatus for displaying lyrics on a display unit, said lyric display method comprising:

a position calculating portion for calculating, on the basis of mathematical computation by use of parameters with respect to bars, a position of lyrics represented by lyric data in the orthogonal direction to a displayed progression direction of the lyrics represented by lyric data on a screen of said display unit: and a display portion for displaying the lyrics represented by lyric data at the calculated position.

* * * * *